United States Patent [19]

Kojima

[11] Patent Number: 4,733,258
[45] Date of Patent: Mar. 22, 1988

[54] INTERCHANGEABLE LENS CAMERA SYSTEM

[75] Inventor: Hiroshi Kojima, Sakai, Japan

[73] Assignee: Minolta Camera KK, Japan

[21] Appl. No.: 780,940

[22] Filed: Sep. 27, 1985

[30] Foreign Application Priority Data

Sep. 28, 1984 [JP] Japan .................. 59-204355

[51] Int. Cl.⁴ .......................................... G03B 7/091
[52] U.S. Cl. .................................................. 354/286
[58] Field of Search ......................................... 354/286

[56] References Cited

U.S. PATENT DOCUMENTS

| 4,326,788 | 4/1982 | Ohmori et al. | 354/286 |
| 4,329,040 | 5/1982 | Fukino et al. | 354/286 |
| 4,572,638 | 2/1986 | Nakai et al. | 354/286 |

Primary Examiner—Michael L. Gellner
Attorney, Agent, or Firm—Watson Cole et al.

[57] ABSTRACT

An intermediate accessory, such as a rear converter, a bellows, and an intermediate ring or the like, can be mounted between an interchangeable lens and a camera body. Information relating to the vignetting amount which takes place in the interchangeable lens is divided in two parts, the respective parts are kept in the interchangeable lens and in the intermediate accessory, respectively.

8 Claims, 18 Drawing Figures

Res

Cp

A

B

Cr

S minimum F-number

INTERCHANGEABLE LENS CAMERA SYSTEM

BACKGROUND OF THE INVENTION

1. Field of the Invention

The present invention generally relates to an interchangeable lens camera system, and more particularly relates to a camera system in which an intermediate accessory, such as an intermediate ring, a bellows, or the like, which is used for close-up photographing, can be mounted or interposed between an interchangeable objective lens and a camera body, and also relates to an interchangeable lens, a close-up photographic intermediate accessory, and a camera body, which are used in such a camera system.

2. Description of the Prior Art

Conventionally, when an intermediate accessory, such as a tele-converter or the like, is mounted between a camera body and an interchangeable objective lens, it is known that vignetting is caused within the intermediate accessory. Such a technique whereby the amount of vignetting occurring in the intermediate accessory is transmitted from the intermediate accessory to the camera body so as to correct or restrict exposure control, has been proposed, for example, in U.S. Pat. No. 4,326,788.

The present invention recognizes the fact that the foregoing phenomenon of the vignetting is caused in an interchangeable objective lens in the state where the close-up photographic intermediate accessory is used. The phenomenon of such vignetting, is described hereinafter.

In the case where an intermediate accessory is mounted between an interchangeable objective lens and a camera body in order to perform close-up photographing or high magnification photographing, the shortest object distance (which is a distance from an object to be photographed to the object side surface of the interchangeable lens) is shortened in comparison with the cause of using only the interchangeable objective lens. Here, the minimum effective F-number of a photographing optical system is determined in accordance with an object distance, an effective diameter of a constituent component of the optical system, and the largest aperture of a diaphragm (or alternatively, an aperture diameter of an F-number determining ring). Referring to FIG. 12, this state will be explained with a thin single lens corresponding to an interchangeable objective lens of the whole shifting type by way of example.

In FIG. 12, the reference symbol L designates a lens; the reference symbol $F_\infty$ designates a film surface in the infinity focusing condition; and the reference symbol $F_N$ designates a film surface in the nearest focusing condition. In the infinity focusing condition, a parallel light bundle having a width the same as an effective aperture D of the lens L is entered as shown by a solid line in FIG. 12 and focused on the film surface $F_\infty$. At this time, the minimum effective F-number $F_{No.eff.\infty}$ is determined in accordance with the following equation (1):

$$F_{No.eff.\infty} = 1/2 \sin \theta_1 \qquad (1)$$

where the reference symbol $\theta_1$ designates an exit angle of outer edge light ray.

In the nearest focusing condition, on the contrary, as shown by a dotted line in FIG. 12, the outer edge light ray emitted from an object O enters the lens L as a divergent light bundle and is focused on the film surface $F_N$ disposed optically behind the film surface $F_\infty$ in the infinity focusing condition. At this time, the minimum effective F-number $F_{No.eff.N}$ is determined in accordance with an equation of $$F_{No.eff.N} = 1/2 \sin \theta_2 \qquad (2)$$

where the reference symbol $\theta_2$ designates an exit angle of the outer edge light ray. Since the effective aperture of the thin lens L is equal to the diaphragm aperture in a practical lens system, exposure can be correctly controlled by controlling the diaphragm aperture in the lens system.

In FIG. 12, it is found that in the range from the lens L to the film surface, the outer edge light ray indicated by a dotted line in the nearest focusing condition passes outside (a farther path from an optical axis) the outer edge light ray indicated by a solid line in the infinity focusing condition. That is, this fact shows that in the thick lens system of the whole shifting type, the outer edge light ray in the nearest focusing condition passes outside the outer edge light ray in the infinity focusing condition, in the range behind a diaphragm position, that is, in the range from the diaphragm position to the film surface. Here, ordinarily, an effective diameter of each lens surface of the lens system is determined so that even in the nearest focusing condition of the lens itself, the outer edge light ray is not interrupted. Therefore, the width of the light bundle used in photographing is always controlled by the diaphragm. If the outer edge light ray is interrupted by the effective diameter of the lens disposed behind the diaphragm in the nearest focusing condition, the exit angle $\theta_2$ is determined by the effective diameter of the lens, so that the outer edge light ray passes inside (a path closer to an optical axis) the diaphragm aperture at the diaphragm position. Therefore, even when the aperture of the diaphragm is started to be decreased from the maximum state, there occurs such a phenomenon that the width of the light bundle is not changed. This phenomenon is referred to as "a phenomenon of partial light blocking aperture". In an ordinary interchangeable objective lens, the effective diameter of each lens surface is determined so that such a phenomenon of partial light blocking aperture is not caused in the whole range of focusing distance of the interchangeable objective lens.

Now, in a camera system of the full aperture light measuring type, as shown in FIG. 13, let an AV value corresponding to the minimum effective F-number be represented by $AV_0$; an AV value corresponding to the desired diaphragm aperture be represented by $AV_1$; and an AV value corresponding to a difference between the width of the outer edge light ray and the diaphragm aperture due to the phenomenon of partial light blocking aperture be represented by $\Delta AV_0$; then a diaphragming stroke $\Delta AV_1$ to obtain the desired diaphragm $AV_1$ is is expressed by the following equation (3):

$$\Delta AV_1 = AV_0 + (AV_1 - AV_0) \qquad (3)$$

Here, the $\Delta AV_0$ is referred to as the "amount of partial light blocking aperture". In the ordinary interchangeable objective lens, the effective diameter of each lens surface is determined so that the amount of partial light blocking aperture $\Delta AV_0$ is a negligibly small value in the whole range of focusing distance thereof and therefore the diaphragming stroke $\Delta AV_1$ is controlled on the basis of the following equation:

$$\Delta AV_1 = AV_1 - AV_0 \qquad (4)$$

In the case where the close-up photographic intermediate accessory is mounted between the interchangeable objective lens and the camera body, however, the shortest object distance is considerably shortened in comparison with the case of using only the interchangeable objective lens. This state will be now described with reference to FIGS. 14 and 15.

FIG. 14 shows the case where an intermediate accessory having no lens system, such as an intermediate ring, a bellows, or the like, is used. In the drawing, a solid line indicates the outer edge light bundle in the infinity focusing condition in the state where the intermediate accessory is used. The reference symbol $F_{N1}$ designates a film surface in the case of using the intermediate accessory. FIG. 15 shows an intermediate accessory C having a lens system, such as a macro-converter, or the like. In the drawing, a solid line indicates the outer edge light bundle in the infinity focusing condition in the case where no intermediate accessory is used, while a dotted line indicates the outer edge light bundle in the nearest focusing condition in the case where an intermediate accessory is used. The reference symbol $F_{N2}$ designates a film surface in the case of using the intermediate accessory.

As will be apparent from FIGS. 14 and 15, the use of an intermediate accessory causes the outer edge light bundle (indicated by the dotted line) in the nearest focusing condition to pass outside the outer edge light bundle (indicated by the solid line) in the infinity focusing condition. In order to prevent such a phenomenon of partial light blocking aperture as described above from occurring even in the state where an intermediate accessory is used, it is necessary that not only the effective diameter of each lens surface of the interchangeable objective lens disposed behind a diaphragm, but also the effective diameter of the intermediate accessory are made large. The ordinary interchangeable objective lens, however, is designed so that no phenomenon of vignetting is caused merely in the case of using only the objective lens without taking the case of using any intermediate accessory into consideration. This is because if the case of using any intermediate accessory is taken into consideration, the diameter of the lens disposed behind the diaphragm of the interchangeable objective lens becomes extremely large and therefore not only the interchangeable objective lens becomes heavy, large, expensive, but also the aberration in off-axial region is determined.

The same applies also to the intermediate accessory, and if it is considered to prevent the phenomenon of partial light blocking aperture from occurring with respect to any interchangeable objective lens, the intermediate accessory per se becomes large and heavy, particulary, in the case where a macroconverter is mounted on the interchangeable objective lens having a large aperture, the light bundle is interrupted in the lens system of the converter, resulting in the phenomenon of the partial light blocking aperture. This is known, for example, in the above-mentioned U.S. Pat. No. 4,326,788.

Conventionally, however, much attention has not been paid on such a phenomenon of vignetting caused by the interruption of the light bundle in the interchangeable objective lens itself because of mounting a close-up photographic intermediate accessory. The present invention has paid attention to such a phenomenon of partial light blocking aperture due to the vignetting caused in an interchangeable lens. Description will be made as to this phenomenon more in detail. FIG. 16 shows the state where an interchangeable objective lens 2 is mounted on a camera body 4, and the diameter of the effective light bundle is controlled by the aperture diameter of a diaphragm S in the interchangeable objective lens 2. FIG. 17 shows the state where an intermediate ring 6 is mounted between the interchangeable objective lens 2 and the camera body 4. In this state, the width of the effective light bundle is defined by the rearmost surface RR of a rear lens group RG in the interchangeable objective lens 2 and the diaphragm S does not define the light bundle in the beginning of stopping down of the diaphragm S. That is, the phenomenon of partial light blocking aperture is caused by the lens system in the interchangeable objective lens 2. The reference symbol F designates a film surface. FIG. 18 shows the state where a macro-converter lens 8 is mounted between the interchangeable objective lens 2 and the camera body 4. Even in this state, the light bundle is interrupted by the rearmost surface RR of the interchangeable objective lens 2, resulting in a similar phenomenon of the partial blocking aperture as described above.

The foregoing phenomenon of partial light blocking aperture in the interchangeable objective lens is caused not only in the lens system of the whole lens shifting type but also in any lens system of any type, such as an internal focusing type, a rear focusing type, and so on. In the case of any type other than the whole lens shifting type, the phenomenon of partial light blocking aperture is generated not only in the range behind the diaphragm position but also in the range in front of the diaphragm position. For example, in the case where a bellows is mounted on the interchangeable objective lens of the front lens shifting type, if the bellows is extended so as to shift the whole of the interchangeable objective lens, the vignetting is caused on a lens surface disposed behind a diaphragm, and in this state, if a front lens of the interchangeable objective lens is shifted, the vignetting is caused on a lens surface disposed in front of the disphragm. That is, the vignetting in the interchangeable objective lens is caused on various different lens surfaces depending on the type of lens, type of focusing, or the like.

Since the amount of the partial light blocking aperture due to the vignetting is not negligibly small, there is such a problem that proper exposure can not be obtained under the exposure operation control performed on the basis of the equation (4) in which the amount of partial light blocking aperture is disregarded.

SUMMARY OF THE INVENTION

An object of the present invention is to provide a camera system in which a proper exposure calculation can be achieved even if there occurs the foregoing vignetting caused in an interchangeable lens in the case where an intermediate accessory is used.

Another object of the present invention is to provide a camera body suitable for the camera system of the type as described above.

A further object of the present invention is to provide an interchangeable objective lens suitable for the camera system of the type as described above.

Still a further object of the present invention is to provide an intermediate accessory suitable for the camera system of the type as described above.

The above and other objects, features and advantages of the present invention will become apparent from the following detailed description taken in conjunction with the accompanying drawings.

DETAILED DESCRIPTION OF THE PREFERRED EMBODIMENTS

Figure 1:
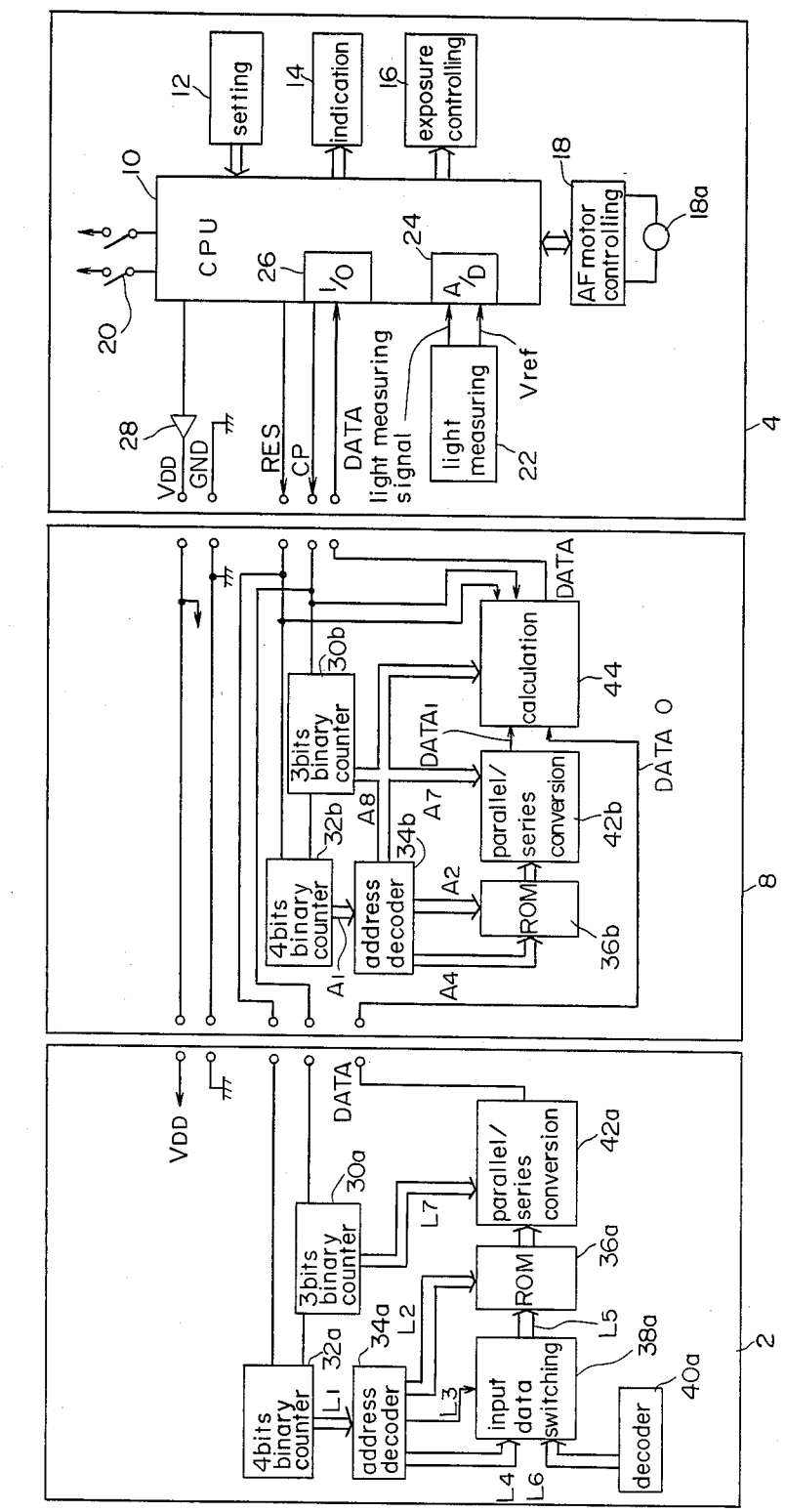
FIG. 1 is a block diagram showing a first embodiment according to the present invention.

First, an outline of a first embodiment according to the present invention will be described. Now, the amount of partial light blocking aperture generated due to the vignetting caused in an interchangeable objective lens in the case of using a close-up photographic intermediate accessory is represented by $\Delta AV_0$. Here, if the data concerning $\Delta AV_0$ is stored only in the intermediate accessary, it is impossible to correspond to the changes in $\Delta AV_0$ caused in accordance with changes in magnification of various interchangeable objective lens, zoom objective lens, etc., and on the contrary, if the data are stored only in the interchangeable objective lens, it is impossible to correspond to the changes in $\Delta AV_0$ caused depending on changes in magnification of various close-up photographic intermediate accessory, zoom macro-converter, etc. Accordingly, according to the present invention, the $\Delta AV_0$ is divided into two portions $\Delta AV_{0(L)}$ and $\Delta AV_{0(A)}$ which are then stored in the interchangeable objective lens and the close-up photographic intermediate accessory, respectively. Therefore, the following equation is established:

$$\Delta AV_0 = \Delta AV_{0(L)} + \Delta AV_{0(A)} \tag{5}$$

Here, the value $\Delta AV_{0(L)}$ changes as the focusing or zooming of the interchangeable objective lens is performed and therefore it will do to arrange such that the data stored in a read only memory (ROM) mya be selectively read out therefrom in accordance with the various changes as described above so as to produce the data as the value of $\Delta AV_{0(L)}$. On the other hand, the value $\Delta AV_{0(A)}$ changes in accordance with various changes in magnification and kind of the intermediate accessory, and therefore it will do to arrange such that the data stored in another ROM may be selectively read out therefrom in accordance with the various changes concerning the intermediate accessary as described above so as to produce the data as the value of $\Delta AV_{0(L)}$.

Let the minimum F-number of the interchangeable objective lens be represented by $AV_{0(L)}$ (variable value in the case of the zoom lens), and the amount of change in minimum F-number due to the intermediate accessory be represented by $AV_{0(A)}$ (variable value in the case of an intermediate accessory having a variable magnification), then the following equations are established.

$$CVC(L) = AV_{0(L)} + \Delta AV_{0(L)} - X \tag{6}$$

$$CVC(A) = AV_{0(A)} = \Delta AV_{0(A)} + X \tag{7}$$

Here, the symbol X designates the amount of bias described later. According to the present invention, the value of CVC(L) expressed by the equation (6) is stored in an address into which the value $AV_{0(L)}$ is stored in the ROM in the interchangeable objective lens. The value of CVC(A) expressed by the equation (7), on the contrary, is stored in an address into which the value $AV_{0(A)}$ is stored in the ROM in the intermediate accessory.

In the intermediate accessory, the minimum F-number value $AV_{0(B)}$ and the amount of partial light blocking aperture CVC(B) to be transmitted to the camera body are calculated in accordance with the following equations:

$$AV_{0(B)} = AV_{0(L)} + AV_{0(A)} \tag{8}$$

$$CVC(B) = CVC(L) + CVC(A) \tag{9}$$

Here, the equation (9) is developed as follows:

$$CVC(B) = AV_{0(L)} + \Delta AV_{0(L)} - X + AV_{0(A)} + \Delta AV_{0(A)} + X \tag{10}$$

Then, if the equation (10) is arranged and the equations (5) and (8) are substituted into the equation (10), the following equation can be obtained:

$$CVC(B) = AV_{0(B)} + \Delta AV_0 \tag{11}$$

Here, $CVC(B) \geq AV_{0(B)}$ is established.

In the case where the interchangeable objective lens is directly mounted on the camera body without using any intermediate accessory, on the other hand, $AV_{0(B)}$ and CVC(B) are calculated in accordance with the following equations respectively:

$$AV_{0(B)} = AV_{0(L)} \tag{12}$$

$$CVC(B) = CVC(L) \tag{13}$$

$$= AV_{0(L)} = \Delta AV_{0(L)} - X$$

In this case, even if CVC(B) is transmitted to the camera body, the compensation about the vignetting should not be performed. Then, if the amount of bias X is selected so that an inequality $\Delta AV_{0(L)} \leq x \leq AV_{0(L)} + \Delta AV_{0(L)}$ is satisfied in order to avoid an error due to quantization in the case where the value of CVC(B) becomes negative, the amount of compensation=max {CVC(B), $AV_{0(B)}$}−$AV_{0(B)}$ becomes:

(i) $AV_0$ in the case of using an intermediate accessory; and (ii) Zero in the case of using only the interchangeable objective lens.

That is, thus, in the case of (ii), the data concerning the amount of vignetting is never transmitted to the camera body, and it is possible to perform the compensation in accordance with the amount of partial light blocking only in the case of using the intermediate accessory.

FIG. 1 shows an embodiment in which a rear converter 8 with a fixed magnification for close photographing is interposed between a camera body 4 and an interchangeable objective lens 2. The camera body 4 is provided with a microprocessor 10 which controls the operation of the entire system and which is coupled with a setting means 12, an indication device 14, an exposure control means 16, an AF motor control means 18, a light measuring circuit 22, and so forth. In the setting means 12, values representing the photographing conditions, such as a photographing mode, a film sensitivity, a shutter speed, a diaphragm value, and so on, are manually set and the setting means 12 produces signals corresponding to those set values. The display device 14 visibly or audibly indicates the shutter speed and the diaphragm value which are to be automatically controlled in accordance with the results of various arithmetic operations performed in the microprocessor 10, and indicates the selected photographing mode, warning of a blur occurring shutter speed, and whether an in-focus condition has been achieved or not. The exposure control means 16 controls the shutter speed and/or the diaphragm aperture in response to an exposure control output from the microprocessor 10. The AF motor control means 18 drives an AF motor 18a in response to a focus control output from the microprocessor 10. The light measuring circuit 22 measures light from an object to be photographed in response to the closure of a light measuring switch 20 and generates a light measurement output for the focus adjustment and exposure control. An A/D converter 24 is for converting the light measurement output which is the form of an analog signal into a digital signal. An I/O port 26 is for supplying clock pulses to the objective lens 2 and the converter lens 8 and for taking in the signal transmitted from the objective lens 2 directly or via the converter lens 8. A common terminal GND is for grounding, and a terminal VDD is for supplying power therethrough to the circuit of the camera-objective lens 2 and the converter 3 via a buffer 28.

A 3-bit binary counter 30a and 4-bit binary counter 32a are provided in the objective lens 2. The 3-bit binary counter is for counting the clock pulses fed from the I/O port of the microprocessor 10 in the camera body 4 so as to produce a pulse every time when it has counted eight clock pulses, and the 4-bit binary counter 32a is for counting the output pulses produced from the 3-bit binary counter 30a. The output L1 of the 4-bit binary counter 32a is applied to an address decoder 34a the output of which is divided into two signals; that is a signal L2 which designates the higher-order three of eight bits of an address in an ROM 36a, and a signal L4 which designates the lower-order five of the eight bits of the address. The signal L2 is directly given to the ROM 36a, and the signal L4 is given to the ROM 36a via an input selection circuit 38a. In the case a zoom lens is used as the objective lens 2, the input selection circuit 38a receives the output of a decoder 40a which moves relatively to a code plate and reads electrically or optically a code at the position corresponding to a selected zoom ratio. The decoder 40a generates a signal L6 for designating the lower-order five bits of the address in the ROM in accordance with a set zoom ratio or the focal length. The input selection circuit 38a supplies the signal L4 or L6 to the ROM 36a in response to a selection command signal L3 fed from the address decoder 34a. A parallel/series conversion circuit 42a converts the 8-bit data signal from the ROM 36a into serial data and produces the serial data from a data terminal in response to the output from the 3-bit binary counter 30a.

Similarly to the objective lens 2, the converter lens 8 is provided with a 3-bit binary counter 30b, a 4-bit binary counter 32b, an address decoder 34b, an ROM 36b, and a parallel/series conversion circuit 42b, the functions and mutual relationship of which are the same as those in the objective lens 2. The signals having the same suffix correspond to each other. In the ROM 36a of the objective lens 2, the foregoing fixed data to be transmitted to the camera are written in a predetermined address, while in the ROM 36b of the converter lens 8, data necessary for an arithmetic operation to be performed on the data fed from the interchangeable lens 2 are written in a predetermined address. The converter lens 8 is provided therein with an arithmetic circuit 44 which includes, as shown in FIGS. 2, 3, 4, and 5, a serial addition circuit 44a (FIG. 2), a substitution circuit 44b (FIG. 3), a 1-bit left-shifting circuit 44c (FIG. 4) and a 2-bit left-shifting circuit 44d (FIG. 5). These circuits are selected by a signal A8 from the address decoder 34b in the circuit shown in FIG. 1. The arithmetic circuit 44 is supplied with serially converted signals representing the data from the objective lens 2 as well as serially converted signals representing the arithmetic operation data stored in the ROM of converter 8. The arithmetic circuit 44 performs predetermined arithmetic operations on those signals.

Figure 6:
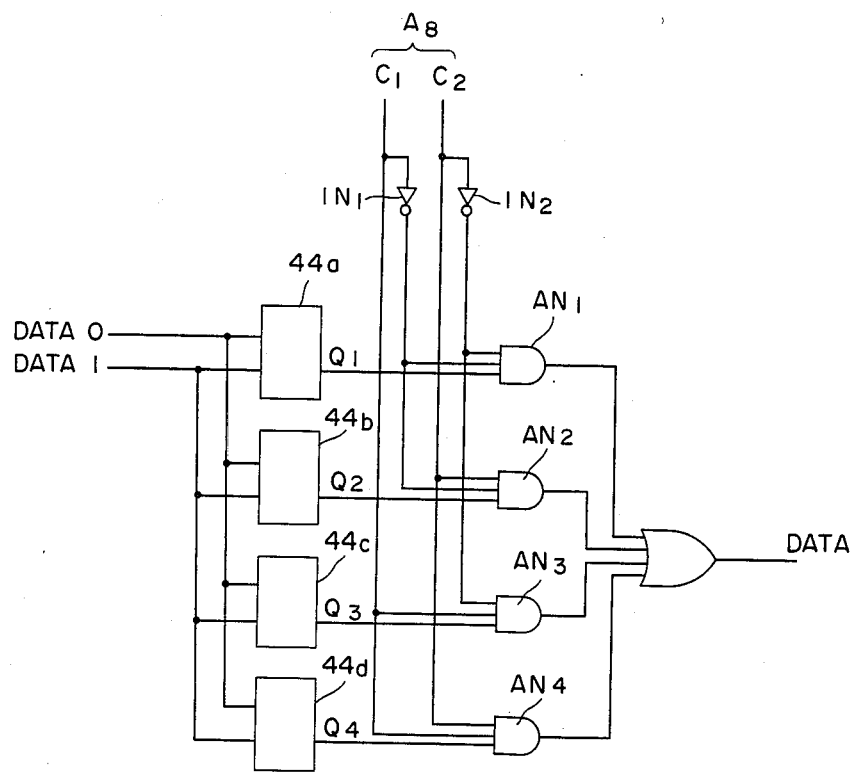

In the circuit of FIG. 6, the data signal $DATA_0$ from the objective lens 2 and the data signal $DATA_1$ from the ROM 36b are applied to each of the serial addition circuit 44a, the substitution circuit 44b, the 1-bit left-shifting circuit 44c, and the 2-bit left-shifting circuit 44d, which are connected to an OR gate OR1 via respective AND gates AN1 to AN4. Control signals C1 and C2 contained in the signal A8 are applied to the input terminal of the AND gates AN1 to AN4 directly or via inverters IN1 and IN2. Thus, as shown in Table 1, the output of a desired one of the arithmetic circuits 44a to 44d is selected.

TABLE 1

| Control Input Signal | | Output Signal | |
|---|---|---|---|
| C1 | C2 | D | Gate to be opened |
| 0 | 0 | Q1 | AN1 |
| 0 | 1 | Q2 | AN2 |
| 1 | 0 | Q3 | AN3 |
| 1 | 1 | Q4 | AN4 |

Figure 2:
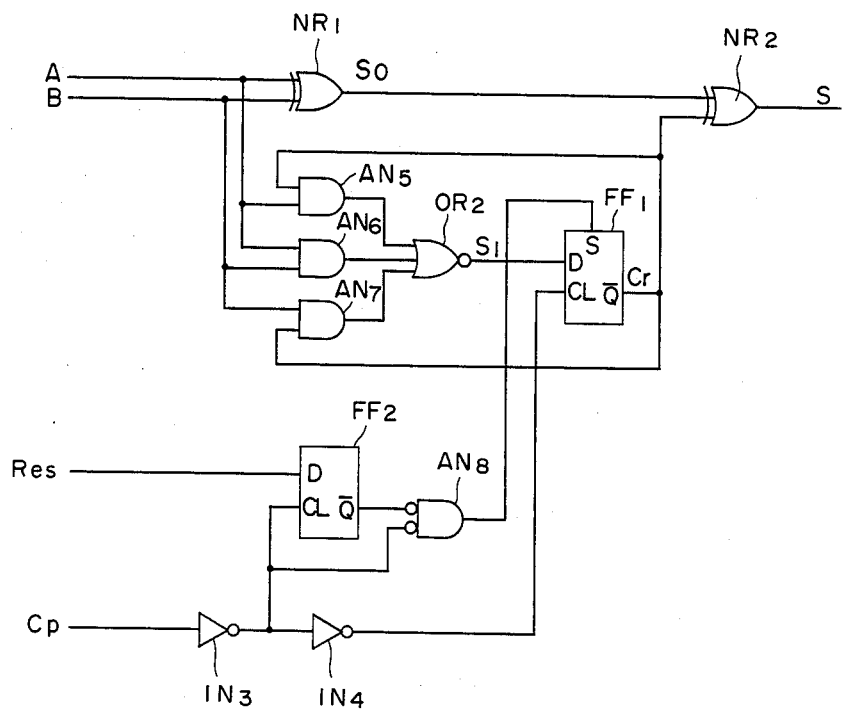
FIGS. 2 to 6 are block diagrams each showing a main part of the first embodiment.
Figure 7:
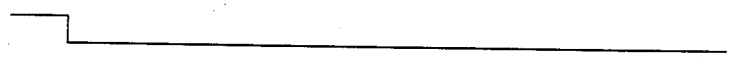
FIG. 7 is a time chart showing operations of FIG. 2.
Figure 7:
Figure 7:
Figure 7:
Figure 7:
Figure 7:

In the addition circuit 44a as shown in FIG. 2, first, the carry information Cy produced from the $\bar{Q}$ terminal of a flip-flop FF1 is reset by a reset pulse Res, which is to be input in advance of a clock pulse Cp. Next, the two sets of serial data $DATA_0$ and $DATA_1$ fed from the respective ROMs of the objective lens 2 and the converter lens 8 are sequentially respectively applied to the two input terminals A and B in synchronism with the clock pulse CP, two bits after two bits starting from the least significant bit LSB. The output So of a NOR gate NR1 is an exclusive OR $A \oplus B$. By means of an exclusive NOR NR2, the exclusive OR $A \oplus B$ is further exclusively ORed with Cy and the resultant exclusive OR $A \oplus B \oplus Cy$ is produced from the output NOR gate NR2 as a sum signal S. A carry data output S1 produced from an OR gate OR2 and inverted at the output of the OR gate OR2 is delayed in the D-type flip-flop FF1 by one clock period and produced as the carry data Cy therefrom for performing an adding operation in the next digit. In the example of the waveforms shown in FIG. 7, the signal A is "00011110", the signal B is "00001010", the carry signal is "00011100", and the sum signal S is "00101000".

Figure 3:
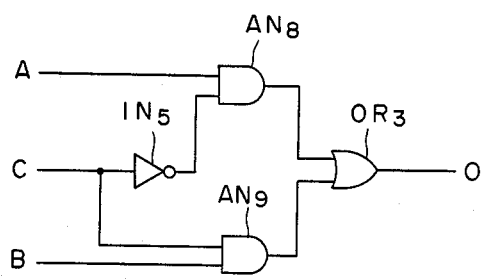

In the substitution circuit 44b illustrated in FIG. 3, a control input signal C is applied the respective one input terminals of AND gates AN8 and AN9 via an invertor IN5 and directly respectively, the respective other input terminals of the AND gates AN8 and AN9 being supplied with the data inputs A and B respectively, so that an OR gate OR3 produces the signal A when the control input signal C is "0" while produces the signal B when the control input signal C is "1".

Figure 4:
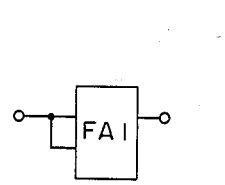
Figure 5:
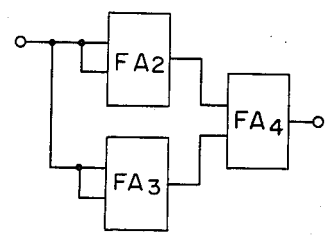

FIGS. 4 and 5 show the 1-bit and 2-bit left-shifting circuits 44c and 44d respectively. The 1-bit left-shifting circuit 44c of FIG. 4 comprises a single 2-input addition circuit FA1 two input terminals which are connected to each other to form a single input. The 2-bit left-shifting circuit 44d comprise a first, a second and a third 2-input addition circuits FA2, FA3, and FA4, all the input terminals of the first and second 2-input addition circuits FA2 and FA3 being connected with each other to form a single common input, the respective outputs of the addition circuits FA2 and FA3 being connected the two input terminals of the third addition circuit FA4 so as to derive the output of the 2-bit left-shifting circuit 44d from the output terminal of the third addition circuit FA4.

Figure 8:
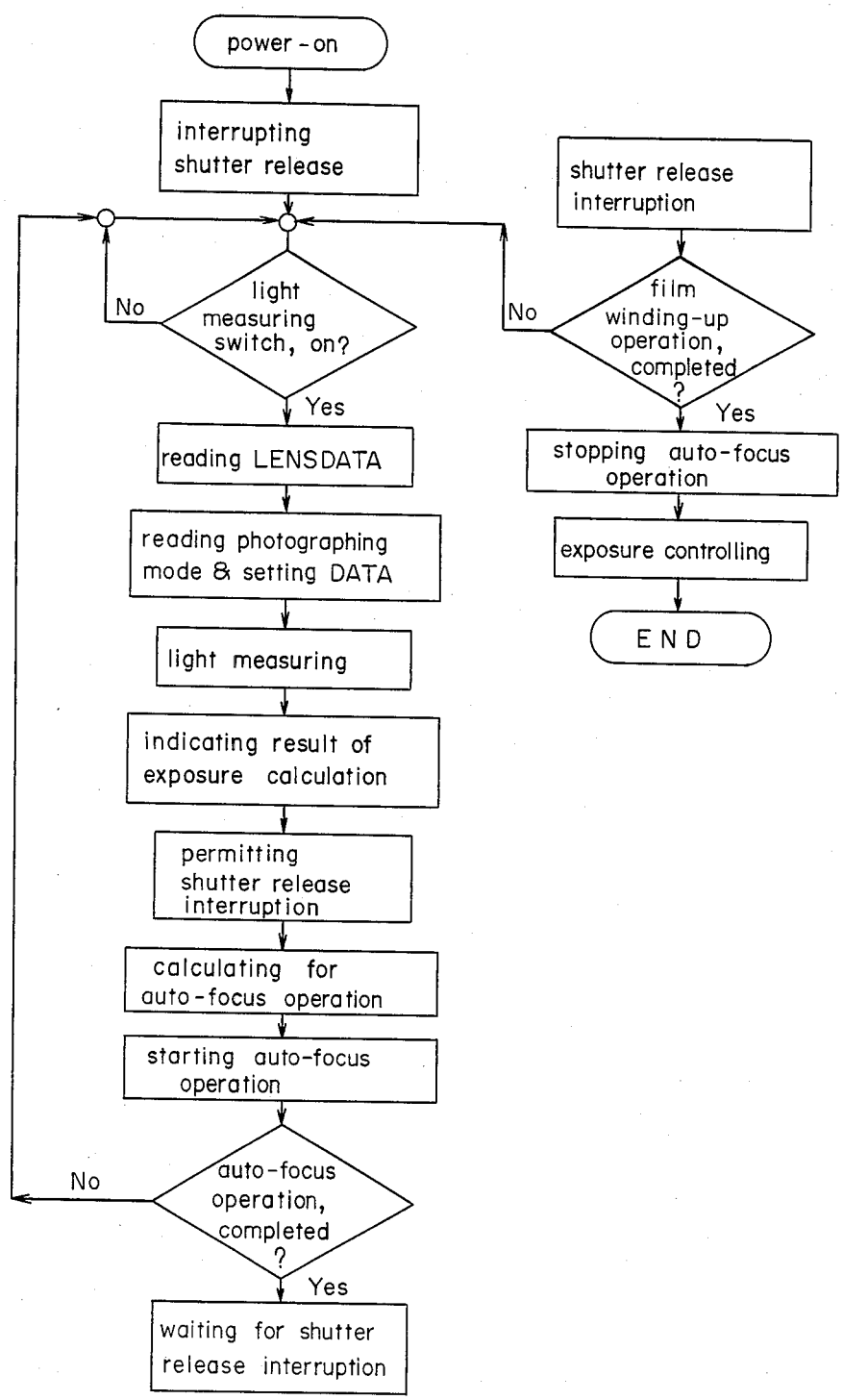
FIG. 8 is a flowchart showing the operation of the first embodiment.

FIG. 8 shows the operational sequence of the microprocessor illustrated in FIG. 1. The operation of the microprocessor will be described with reference to FIG. 8. When a power supply switch (not shown) of the camera body is turned on, the microprocessor 10 performs initialization. Thereafter, if the light measuring switch 20 is turned on, the microprocessor 10 starts the sequence of reading data of the lens system. First, the power source voltage VDD is initiated to be supplied to the objective lens 2 and the converter lens 8 via the buffer 28. Then, the resetting operation of the circuits of the objective lens 2 and the converter 8 is performed by changing over the level of the reset pulses RES from Low to High. After the reset operation is completed, the microprocessor 10 in the camera body 4 starts the sending out of the clock pulses CP from the I/O port. These clock pulses are simultaneously supplied to both the objective lens 2 and the converter lens 8. The respective 3-bit binary counters 30a and 30b of the objective lens 2 and the converter 8 produce one pulse every time when they have received eight clock pulses and supply the pulse to the next stage 4-bit binary counters 32a and 32b respectively. The 4-bit binary counters 32a and 32b sequentially generate the signals L1 and A1 respectively as shown in Table 2, in response to the pulses fed from the 3-bit binary counters 30a and 30b respectively, and supplies those signals L1 and A1 to the address decoders 34a and 34b respectively.

TABLE 2

| Input The order of input pulse | Output L1/A1 |
|---|---|
| 1 | 0000 |
| 2 | 0001 |
| 3 | 0010 |
| 4 | 0011 |
| 5 | 0100 |
| 6 | 0101 |
| 7 | 0110 |
| 8 | 0111 |
| 9 | 1000 |

The address decoders 34a and 34b respectively generate the signals L2 and L4 and A2 and A4 for designating addresses of the ROMs 36a and 36b, in accordance with the signals L1 and A1 from the 4-bit binary counters 32a and 32b. The signals L2 and A2 designate the higher-order three of the eight bits of the respective addresses of the ROMs 36a and 36b, while the signals L4 and A4 respectively designate the lower-order five of the same eight bits of the addresses. In addition, when a zoom lens is used as the objective lens 2, the lower-order five bits of the address of the ROM 36a may be designated by means of the output L6 of the decoder 40a which corresponds to the selected zoom ratio. The selection of the address lower-order 5-bit designating data L4 and L6 is performed in the input selection circuit 38a by means of the output L3 of the address decoder 34a and the output L5 of the input selection circuit 38a designates the address lower-order five bits.

Tables 3 to 5 show the relationships among the respective addresses of the fixed focal length objective lens, the zoom objective lens and the converter lens, and the outputs of the address decoders 34a and 34b.

TABLE 3

| (Fixed focal length objective lens) | | | |
|---|---|---|---|
| | Address higher-order 3-bits | Address lower-order 5-bits | |
| L1 | L2 | L5 | Contents of data |
| 0000 | 000 | 00000 | Imperfect coupling checking code |
| 0001 | 000 | 00001 | Minimum F-number |
| 0010 | 000 | 00010 | Maximum F-number |
| 0011 | 000 | 00011 | Full aperture light measuring error compensation |
| 0100 | 000 | 00100 | Release time lag |
| 0101 | 000 | 00101 | Partial light blocking aperture data |
| 0110 | 000 | 00110 | Rotational direction of AF motor |
| 0111 | 000 | 00111 | AF lens position shifting amount conversion coefficient |
| 1000 | 000 | 01000 | Focal distance |

TABLE 4

| (Zoom objective lens) | | | | |
|---|---|---|---|---|
| | | Address higher-order 3-bits | Address Lower-order 5-bits | |
| L1 | L3 | L2 | L5 | Contents of data |
| 0000 | 0 | 000 | 00000 | Imperfect coupling |

TABLE 4-continued (Zoom objective lens)

| L1 | L3 | Address higher-order 3-bits L2 | Address Lower-order 5-bits L5 | Contents of data |
|---|---|---|---|---|
| 0001 | 1 | 001 | ∅∅∅∅∅ | Minimum F-number checking code |
| 0010 | 1 | 010 | ∅∅∅∅∅ | Maximum F-number |
| 0011 | 0 | 000 | 00011 | Full aperture light measuring error compensation |
| 0100 | 0 | 000 | 00100 | Release time lag |
| 0101 | 0 | 000 | ∅∅∅∅∅ | Partial light blocking aperture data |
| 0110 | 0 | 000 | 00110 | Rotational direction of AF motor |
| 0111 | 1 | 011 | ∅∅∅∅∅ | AF lens position shifting amount conversion coefficient |
| 1000 | 1 | 100 | ∅∅∅∅∅ | Focal distance |

"∅" represents "0" or "1".

TABLE 5

(Converter)

| A1 | Address higher-order 3-bits A2 | Address lower-order 5-bits A4 | Contents of data | Arithmetic operation | C1 | C2 |
|---|---|---|---|---|---|---|
| 0000 | 000 | 00000 | Imperfect coupling checking code | Addition | 0 | 0 |
| 0001 | 000 | 00001 | Minimum F-number | Addition | 0 | 0 |
| 0010 | 000 | 00010 | Maximum F-number | Addition | 0 | 0 |
| 0011 | 000 | 00011 | Full aperture light measuring error compensation | Substitution | 0 | 1 |
| 0100 | 000 | 00100 | Release time lag | Addition | 0 | 0 |
| 0101 | 000 | 00101 | Partial light blocking aperture data | Addition | 0 | 1 |
| 0110 | 000 | 00110 | Rotational direction of AF motor | Addition | ·0 | 0 |
| 0111 | 000 | 00111 | AF lens position shifting amount conversion coefficient | Shifting or addition | 1(0) 0 | 0(1) 0 |
| 1000 | 000 | 01000 | Focal distance | Addition | 0 | 0 |

The ROMs 36a and 36b transfer the 8-bit data as to the respective addresses designated by the signals L2 and L5 and by the signals A2 and A4, in the order of L1 and A1 to the 8-bit parallel/series conversion circuits 42a and 42b. Each of the 8-bit parallel/series conversion circuits 42a and 42b sequentially converts the received 8-bit parallel data, for example, into 8-bit serial data from the lower-order. The control of the converting timing is performed on the basis of the outputs L7 and A7 from the 3-bit binary counters 30a and 30b respectively. Table 6 shows the logic of the conversion.

TABLE 6

| L7/A7 | Output |
|---|---|
| 0 0 0 | 0 0 0 0 0 0 0 0 1 |
| 0 0 1 | 0 0 0 0 0 0 0 1 0 |
| 0 1 0 | 0 0 0 0 0 0 1 0 0 |
| 0 1 1 | 0 0 0 0 0 1 0 0 0 |
| 1 0 0 | 0 0 0 0 1 0 0 0 0 |
| 1 0 1 | 0 0 1 0 0 0 0 0 1 |

TABLE 6-continued

| L7/A7 | Output |
|---|---|
| 1 1 0 | 0 1 0 0 0 0 0 0 0 |
| 1 1 1 | 1 0 0 0 0 0 0 0 0 |
|  | Highest-bit ... Lowest-bit |

In the sequence as described above, the DATA$_0$ and DATA$_1$ are supplied into the arithmetic circuit 44 from the ROM 36a of the objective lens 2 and the ROM 36b of the converter lens 8, respectively. At this stage, outputs of the result of the desired arithmetic operation are selected and produced in accordance with the operation designation data C1 and C2 produced from the address decoder 34b, in the foregoing arrangement as illustrated in FIG. 9 through FIG. 14.

After the microprocessor 10 in the camera body 4 has received the necessary data from the objective lens 2 via the converter 8 through the serial I/O port, the microprocessor 10 reads out the binary coded data as to the photographing mode, the set shutter speed, the diaphragm value, and the apex values Tv, Av, and Sv of film sensitivity, out of the setting device, and starts light measurement by means of the light measuring device 22. The A/D converter section 24 receives the light measurement output as well as a reference voltage (Vref), and the light measurement output is subject to binary quantization. The exposure calculation is performed on the basis of the quantized light measurement value, the minimum and maximum F-numbers derived from the objective lens 2 and the converter 8, and the full aperture light-measuring error compensation amount, in consideration of the photographing mode derived from the setting device 12. The result of the exposure calculation (for example, Av+Tv) is displayed at the display device 14 and transferred to the exposure control device 16. At this stage, the microprocessor 10 releases the inhibition of interruption by the shutter release operation so that the shutter release is enabled to be performed.

The camera then starts the range-finding or focus detecting operation for automatic focusing and determines the amount and direction of the rotation of the AF motor 18a, on the basis of the result of the focus detection, the lens shifting amount coefficient derived from the converter 8, and the AF motor rotational direction data. The result of the determination is sent to the AF motor control device 18 which controls the shifting of the lens in accordance with the input data.

Upon completion of the automatic focusing operation, the camera proceeds to the next step where it waits for interruption by a shutter release operation and proceeds to the interruption processing routine. If the release operation is made before the automatic focusing operation has been completed, the camera proceeds to the interruption processing routine and stops its automatic focusing operation, and then proceeds to the step of the exposure control operation.

The exposure control device 16 performs the control of the camera photographing operation, including the shutter speed and diaphragm control, in accordance with the previously obtained result of the exposure calculation and the release time lag data supplied from the objective lens 2 and converter 8, and a cycle of camera-operation is thus completed.

Figure 9:
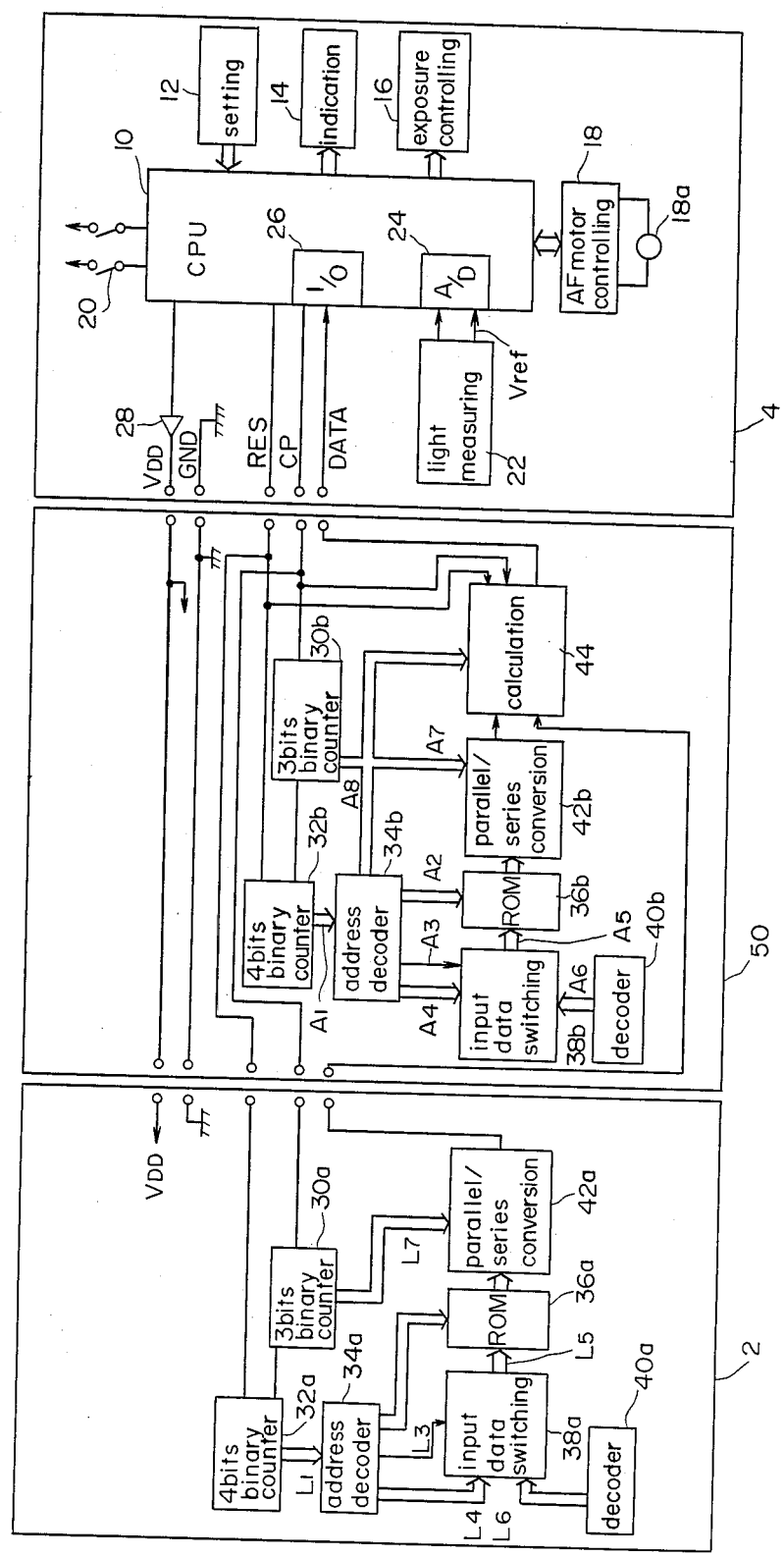
FIG. 9 is a block diagram showing a second embodiment according to the present invention.

The following, description relates to the case in which a variable-magnification zoom converter 50 is mounted between objective lens 2 and camera body 4. FIG. 9 shows the block diagram of a circuit therefor. In FIG. 9, the units and control signals which perform the same functions as those in FIG. 1 are referenced correspondingly and there description is omitted. Similarly to the fixed magnifying factor converter lens, the zoom converter 50 will be satisfactorily carried out if it performs arithmetic conversion of the data fed from an objective lens in accordance with the set zoom ratio (magnifying power) of the zoom converter and sends the result to the camera body. In the case of the zoom converter, however, it is not possible to add a fixed value to the received data, since the data to be added or substituted changes in accordance with the zooming. Therefore, a decoder should be used which included, for example, a code plate means movable relative to the code plate for electrically or optically reading a code on the code plate. For example, accordingly, a decoder 40b for producing an address signal A6 having a value corresponding to the zoom ratio of the zoom converter lens is provided in the zoom converter 50 to make it possible to refer to the value in the data table previously set in a ROM 36b. The logic table corresponding to Table 5 is shown in Table 7. The selection of the address lower-order 5-bit designating data A4 and A6 is performed in an input selection circuit 38b by means of the output A3 of a decoder 34b. The output A5 of the input selection circuit 38b designates the address lower five bits in the ROM 36b.

TABLE 7

| | | (Zoom converter) | | | |
| --- | --- | --- | --- | --- | --- |
| A1 | A3 | Address higher-order 3-bits A2 | Address lower-order 5-bits A4 | Contents of data | Arithmetic operation |
| 0000 | 0 | 000 | 00000 | Imperfect coupling checking code | Addition |
| 0001 | 1 | 001 | ∅∅∅∅∅ | Minimum F-number | Addition |
| 0010 | 1 | 010 | ∅∅∅∅∅ | Maximum F-number | Addition |
| 0011 | 0 | 000 | 00011 | Full aperture light measuring error compensation | Substitution |
| 0100 | 0 | 000 | 00100 | Release time lag | Addition |
| 0101 | 0 | 000 | ∅∅∅∅∅ | Partial light blocking aperture data | Addition |
| 0110 | 0 | 000 | 00110 | Rotational direction of AF motor | Addition |
| 0111 | 1 | 011 | ∅∅∅∅∅ | AF lens position shifting amount conversion coefficient 1 | Shifting or addition |
| 1000 | 1 | 100 | ∅∅∅∅∅ | Focal distance | Addition |

"∅" represents "0" or "1".

The camera operating sequence is the same as the sequence previously described with reference to FIG. 8. With respect to the minimum and maximum F-numbers, the lens shifting amount conversion coefficient, the focal length, and the partial light blocking aperture data, however, an arithmetic operation is performed on the data fed from the objective lens for obtaining appropriate values in compliance with the zoom ratio of the zoom converter lens, and then those calculated values are transferred to the camera body.

Although the addition of the equation (10) is performed in the close-up photographic intermediate accessory in the embodiment, the addition may be performed in the camera body per se. Alternatively, arrangement may be made such that the data concerning $CVC(L)$ and $AV_{0(L)}$ are stored in the interchangeable objective lens, while the data concerning $CVC(A) - AV_{0(A)}$ and $AV_{0(A)}$ are stored in the close-up photographic intermediate accessory, and calculation is made in accordance with the following equations (14) and (15) in the camera body or in the close-up photographic intermediate accessory:

$$CVC(L) + CVC(A) - AV_{0(A)} + AV_{0(A)} = CVC(L) + CVC(A) = CVC(B) \quad (14)$$

$$AV_{0(L)} + AV_{0(A)} = AV_{0(B)} \quad (15)$$

Here, in the case where the interchangeable objective lens is a zoom lens with variable F-number, however, the calculation is performed such that the amount of variable F-number $AV_{0(L)z}$ is added to values obtained by the equations (14) and (15).

In another embodiment, the data concerning $\Delta AV_{0(L)}$ (the amount of partial light blocking aperture due to the vignetting in the interchangeable objective lens) shown in the equation (5) are stored in advance in the predetermined address in the ROM 36a, and the data are transmitted to the calculation circuit 44 in the rear-converter 8 through the parallel/series conversion circuit 42a. The data concerning $\Delta AV_{0(L)}$ transmitted from the interchangeable objective lens 2 as well as the data concerning $\Delta AV_{0(A)}$ of the equation (5) stored in the predetermined address in the ROM 36b (entered through the parallel/series conversion circuit 42b) are passed through the calculation circuit 44 and transmitted to the microprocessor 10 in the camera body 4. In the microprocessor 10, among the transmitted data concerning $\Delta AV_{0(L)}$ and $\Delta AV_{0(A)}$, first, a determination is made as to whether the data of $\Delta AV_{0(A)}$ is zero or not and if yes, it is assumed that no intermediate accessory is mounted, and the exposure control is performed on the basis of the fact that $\Delta AV_0$ of the equation (5) is zero. Therefore no compensation by the amount of partial light blocking aperture is performed. If the microprocessor 10 determines that $\Delta AV_0$ is not zero, it is assumed that an intermediate accessory is mounted and the exposure calculation is performed by using the amount of partial light blocking aperture $\Delta AV_0$ determined by the equation (5), that is $$\Delta AV_0 = \Delta AV_{0(A)}.$$

Therefore, the arrangement may be made such that the exposure control is performed on the basis of the amount of partial light blocking aperture $\Delta AV_0$.

In both the embodiments as described above, arrangement may be made so as to display the value of $CVC(B)$ expressed by the equation (11), and in the case, it is possible to display the effective F-number in consideration of generation of the phenomenon of partial light blocking aperture due to the vignetting in the state where close-up photographing is performed by using a close-up photographic intermediate accessory. In the close-up photographing state, ordinarily, the actual effective F-number is exceedingly high in comparison with the F-number displayed in the interchangeable objective lens and therefore the display of the effective F-number is extremely convenient. For example, when it is intended that proper exposure is obtained by performing light measuring by using an external exposure meter in a manual exposure control mode, it is unnecessary to perform complicated exposure compensation in accordance with the photographic magnification, and also it is easy to confirm the actual depth of field. If a value of $AV_{0(B)}$ of the equation (8) is displayed, it is a matter of course that the infinity F-number is displayed.

Further, in the embodiments as described above, a value of CVC(L) expressed by the equation (6) is stored as the data of the amount of partial light blocking aperture $\Delta AV_{0(L)}$ in the interchangeable objective lens, and a value of CVC(A) expressed by the equation (7) is stored as the data of the amount of partial light blocking aperture $\Delta AV_{0(A)}$, so that when $\Delta AV_{0(L)}$ and $\Delta AV_{0(A)}$ are transmitted into the camera body, the whole amount of partial light blocking aperture CVC(B) is obtained by adding $\Delta AV_{0(L)}$ and $\Delta AV_{0(A)}$ to each other as expressed by the equations (10) and (11). In the case where the interchangeable objective lens is directly mounted on the camera body through no close-up photographic intermediate accessory, only the data concerning the minimum F-number $AV_{0(B)}$ are read by the CPU of the camera body so as to be used for the exposure calculation, so that the accuracy thereof is not deteriorated by the data concerning the amount of partial light blocking aperture $\Delta AV_{0(L)}$.

Further determination is made as to whether the amount of partial light blocking aperture $\Delta AV_{0(A)}$ in the intermediate accessory is zero or not to thereby determine whether the interchangeable objective lens is mounted on the camera body through a close-up photographic intermediate accessory or not. Therefore, it is unnecessary to provide any other mechanism for performing the determination and it is possible to simplify the arrangement. Further, in the embodiments according to the present invention, the data concerning the amount of partial light blocking aperture are transmitted as an electric signal. Accordingly, no complicated mechanical transmission mechanism is required so that the arrangement is extremely simplified and highly improved in practical use.

Figure 10:
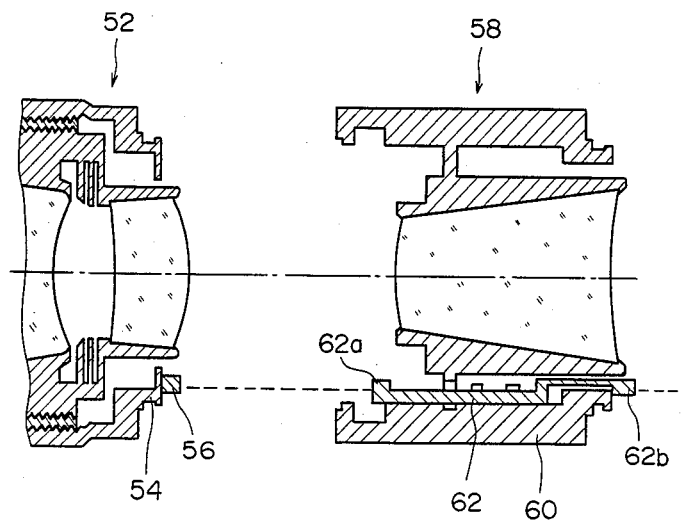
FIG. 10 is a longitudinal cross-section showing a main part of a third embodiment according to the present invention.
Figure 11:
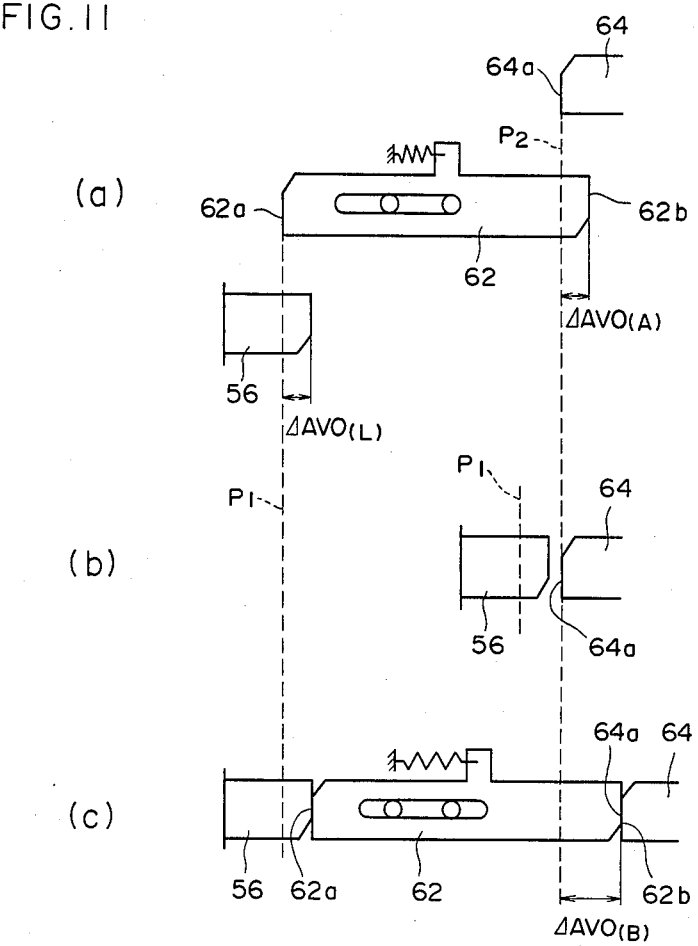
FIG. 11 is a schematic diagram for explaining the operation of the third embodiment.
Figure 12:
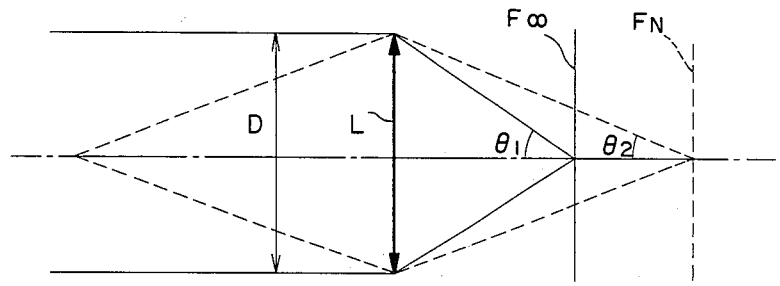
FIGS. 12 and 13 are schematic diagrams for explaining a disadvantage caused by a phenomenon of partial light blocking aperture.
Figure 13:
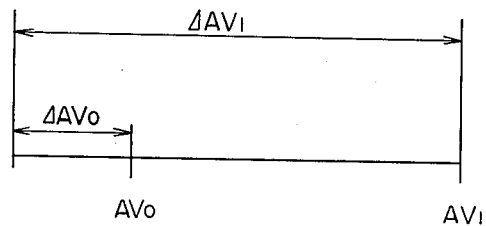
Figure 14:
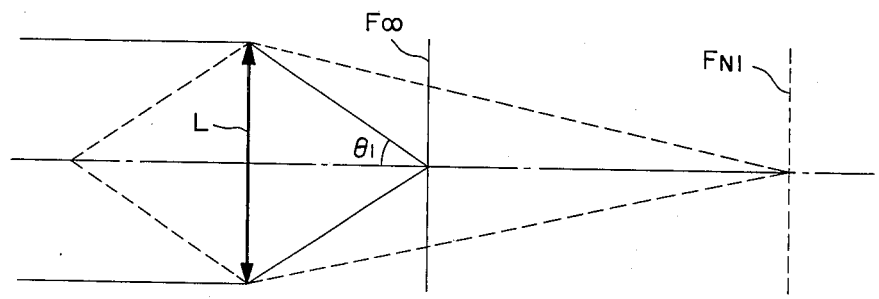
FIGS. 14 and 15 are schematic diagrams showing the states where an intermediate ring and a macro-converter are used respectively.
Figure 15:
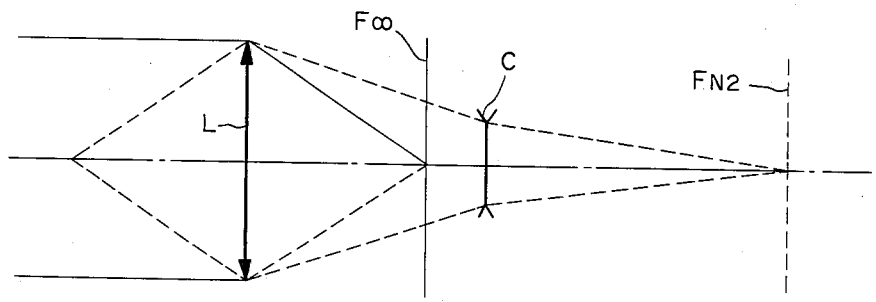
Figure 16:
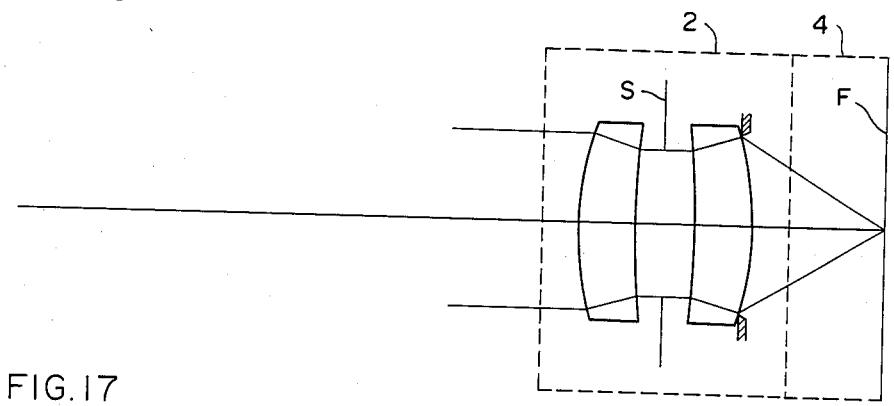
FIGS. 16 to 18 are schematic diagrams each showing shading of luminous flux caused in an interchangeable objective lens in the case where an intermediate ring or a macro-converter is mounted.
Figure 17:
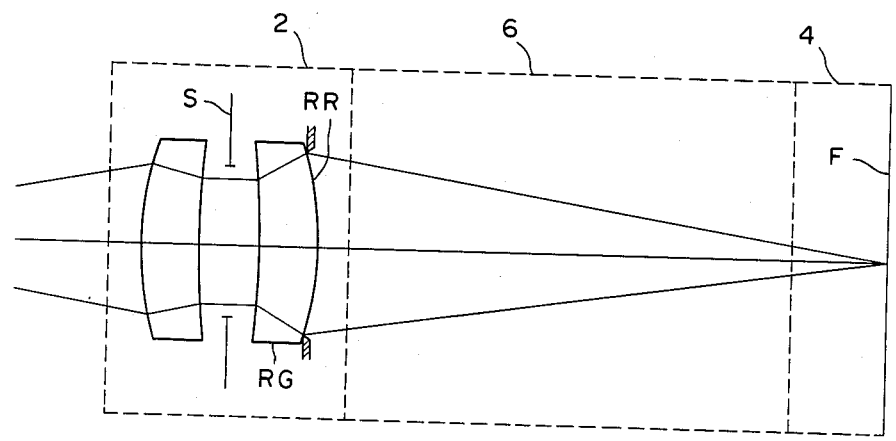
Figure 18:
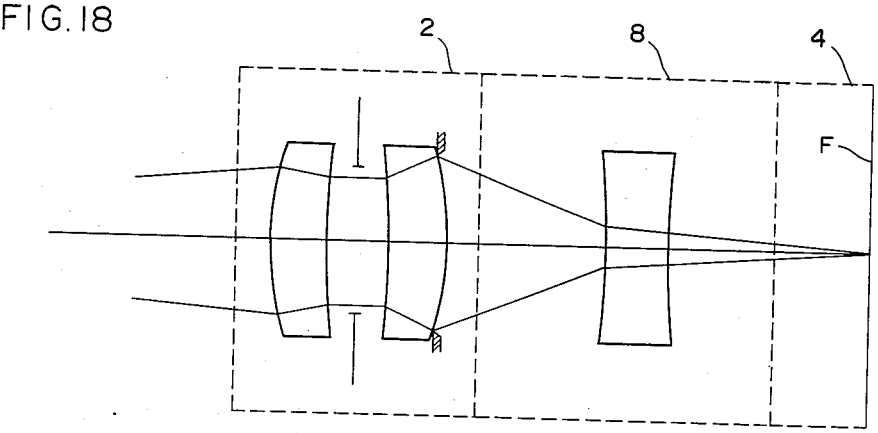

The present invention is not, however, limited to such an arrangement as described above, and the data concerning the amount of partial light blocking aperture may be mechanically transmitted. An example of the arrangement of such mechanical transmission is shown as a third embodiment illustrated in FIGS. 10 and 11. FIG. 10 is a longitudinal cross-section showing an interchangeable lens and a macro-converter according to the third embodiment. FIG. 10 shows an interchangeable lens 52, a fixed lens-barrel pipe 54 therefor, and a partial light blocking aperture signal pin 56 secured to the fixed lens-barrel 54. The amount of projection of the pin 56 projected from a predetermined reference surface P1 of the interchangeable objective lens 52 is determined in accordance with the amount of partial light blocking aperture $\Delta AV_{0(L)}$ due to the vignetting caused in the interchangeable objective lens 52. FIG. 10 further shows a macro-converter 58, a fixed lens-barrel 60 therefor, and a partial light blocking aperture transmission member 62 which is mounted on the fixed lens-barrel 60 slidably in the direction of an optical axis. As illustrated in FIG. 11(a), the transmission member 62 is urged forward in the direction of the optical axis by a spring and set so that a front end surface 62a thereof is coincident with the reference surface P1 in the state where the interchangeable objective lens is mounted. A rear end surface 62b of the partial light blocking aperture tranmission member 62, on the contrary, is projected backward from a predetermined reference surface P2 by the amount corresponding to the partial light blocking aperture $\Delta AV_{0(A)}$ in the macro-converter 58.

In FIG. 11, the reference numeral 64 designates a partial light blocking aperture detection member which is provided in the camera body slidably in the direction of the optical axis and a front end surface 64a thereof conforms to the reference surface P2 in the state where the macro-converter 58 is mounted.

In this arrangement, the interchangeable objective lens 52 is mounted on the macro-converter 68 and the macro-converter 58 is mounted on the camera body, so that the partial light blocking aperture transmission member 62 in the macro-converter 58 is urged backward in the direction of the optical axis by the amount of $\Delta AV_{0(L)}$ by the partial light blocking aperture signal pin 56 in the interchangeable objective lens 52. Then, the partial light blocking aperture detection member 64 in the camera body is pushed backward in the direction of the optical axis by the amount of $\Delta AV_{0(L)} + \Delta AV_{0(A)} = \Delta AV_{0(B)}$ by the partial light blocking aperture transmission member 62. Accordingly, the data of the whole partial light blocking aperture $\Delta AV_{0(B)}$ are transmitted to the camera body as the amount of retreat in the direction of the optical axis of the partial light blocking aperture detection member 64 so as to be used for the exposure calculation (FIG. 11(c)).

In the case where the interchangeable objective lens 52 is directly mounted on the camera body, on the other hand, there is a sufficient space between the reference surface P1 of the interchangeable objective lens 52 and the front surface 64a of the partial light blocking aperture detection member 64 of the camera body as shown in FIG. 11(b) and therefore the partial light blocking aperture signal pin 56 does not abut on the partial light blocking aperture detection member 64. Accordingly, in this case, the value of $\Delta AV_{0(L)}$ is not transmitted to the camera body.

According to the third embodiment, by means of the simple arrangement, it is possible not only to transmit the partial light blocking aperture data in the case of using a macro-converter but to perform ordinary exposure calculation without transmitting the partial light blocking aperture data in the case of using no macro-converter. Therefore, highly accurate exposure calculation can be performed in any case whether the macro-converter is used or not.

The present invention is not limited to the embodiments described above, and a bellows, an intermediate ring, or the like, may be used as the close-up photographic intermediate accessory.

As described above, according to the present invention, the camera system in which a close-up photographic intermediate accessory can be mounted between an interchangeable objective lens and a camera body is featured in that the data concerning the amount of partial light blocking aperture caused by shading of luminous flux in the interchangeable objective lens owing to the mounting of the close-up photographic intermediate accessory are divided into two portions to be separately stored in the interchangeable objective lens and the close-up photographic intermediate accessory respectively, and in that in the camera body, the exposure calculation is performed in accordance with the data concerning the partial light blocking aperture when the close-up intermediate accessory is mounted, whereby it is made possible to perform highly accurate exposure calculation in consideration of the amount of partial light blocking aperture caused by shading of luminous flux in the interchangeable objective lens even in the case of using the close-up photographic intermediate accessory.

Further, the interchangeable objective lens according to the present invention is provided with a partial light blocking aperture data producing means for producing data corresponding to the amount of partial light blocking aperture caused by shading of luminous flux in the interchangeable objective lens in the case of using a close-up photographic intermediate accessory, whereby the interchangeable objective lens is suitable for performing the exposure calculation in consideration of the amount of partial light blocking aperture as described above.

Moreover, the close-up photographic intermediate accessory according to the present invention is provided with means for reading data corresponding to at least a part of the amount of partial light blocking aperture caused by shading of luminous flux in an interchangeable objective lens owing to the mounting of the intermediate accessory, from the interchangeable lens to which the close-up photographic intermediate accessory has been mounted; means for producing data corresponding to the remainder part of the foregoing amount of partial light blocking aperture; and means for transmitting the data corresponding to the amount of partial light blocking aperture in the interchangeable objective lens and the data corresponding to the amount of partial light blocking aperture in the intermediate accessory to the camera body on which the intermediate accessory is mounted, whereby it is made possible to obtain a close-up photographic intermediate accessory suitable for performing the exposure calculation in consideration of the amount of partial light blocking aperture in the interchangeable objective lens.

Furthermore, the camera body according to the present invention is provided with means for reading the data concerning the amount of partial light blocking aperture caused by shading of luminous flux in an interchangeable objective lens owing to the mounting of a close-up photographic intermediate accessory, from the intermediate accessory, and means for performing exposure calculation on the basis of the read-out data, whereby even in the case of using a close-up photographic intermediate accessory, it is made possible to perform highly accurate exposure calculation the same as in the case of using no close-up photographic intermediate accessory.

What is claimed is:

1. A camera system capable of mounting an intermediate accessory between an interchangeable lens and a camera body, comprising:
    first means, provided in the interchangeable lens, for producing a first signal which corresponds to one part of the vignetting amount occurring in the interchangeable lens when the intermediate accessory is mounted between the interchangeable lens and the camera body;
    second means, provided in the intermediate accessory, for producing a second signal which corresponds to the remainder of said vignetting amount; and
    means, provided in the camera body, for calculating an exposure in accordance with both of said first and second signals when the intermediate accessory is mounted between the interchangeable lens and the camera body.

2. A camera system as claimed in claim 1, wherein the intermediate accessory includes means for receiving said first signal from said first signal producing means, means for adding said received first signal to said second signal from said second signal producing means to produce a third signal, and means for transmitting said third signal to said calculating means.

3. A camera system as claimed in claim 2, wherein said calculating means calculates the exposure without said first signal when the interchangeable lens is directly mounted on the camera body.

4. A camera system as claimed in claim 3, wherein said first signal producing means produces a value subtracting a predetermined amount from the part of said vignetting amount as the first signal, and wherein said second signal producing means produces a value adding the predetermined amount to the remainder of said vignetting amount as the second signal, whereby said predetermined amount is cancelled by said adding means when the intermediate accessory is mounted between the interchangeable lens and the camera body, while the part of said vignetting amount is neglected by the predetermined amount in the exposure calculation of said calculating means when the interchangeable lens is directly mounted on the camera body.

5. A camera system as claimed in claim 1, wherein the intermediate accessory includes means for transmitting said first and second signals to the camera body when the intermediate accessory is mounted to the interchangeable lens and the camera body, and wherein the camera body includes means for determining whether the intermediate accessory is mounted therebetween, and wherein said calculating means calculates the exposure in accordance with the transmitted first and second signals when said determining means determines that the intermediate accessory is mounted, and calculates the exposure without said first signal when said determining means determines that the interchangeable lens is directly mounted on the camera body.

6. A camera system as claimed in claim 5, wherein said determining means includes means for determining whether said second signal represents zero to determine that the intermediate accessory is mounted when said second signal represents zero, and to determine that the interchangeable lens is directly mounted on the camera body when said second signal represents other than zero.

7. An intermediate accessory capable of being mounted between an interchangeable lens and a camera body, comprising:
    means for receiving a first signal relating one part of the vignetting amount occurring in the interchangeable lens when the intermediate accessory is mounted between the interchangeable lens and the camera body;
    means for producing a second signal relating to the remainder of said vignetting amount; and
    means for transmitting said first and second signals to the camera body on which the intermediate accessory is mounted.

8. An intermediate accessory as claimed in claim 7, wherein said transmitting means includes means for adding said first signal to said second signal to produce a third signal to be transmitted to the camera body.

* * * * *